Aug. 19, 1958

J. F. ZALESKI ET AL 2,848,694

COAXIAL CAVITY MODULATOR

Filed Oct. 19, 1951

INVENTOR.
JOHN F. ZALESKI
ROBERT CRANE, JR.
BY
*H. A. Mackey*
ATTORNEY.

United States Patent Office 2,848,694
Patented Aug. 19, 1958

2,848,694

COAXIAL CAVITY MODULATOR

John F. Zaleski, Valhalla, and Robert Crane, Jr., Chappaqua, N. Y., assignors to General Precision Laboratory Incorporated, a corporation of New York Application October 19, 1951, Serial No. 252,035

5 Claims. (Cl. 333—82)

This invention pertains to coaxial cavity modulators and more specifically to re-entrant resonant microwave cavities having provision for modulating the microwave energy passed therethrough.

Various microwave systems of the radio ranging and echo type are at present in use and these systems depend for their operation on the transmission of pulsed microwave energy, the reflection thereby from an intercepting body, the receipt of the energy so reflected and the derivation of suitable useful information from the received echo. Frequently systems of this type depend on the modulation or variation of the echo signal by action of the reflecting body as in radar systems for indicating the presence of moving bodies, systems utilizing the Doppler principle and the like.

Such systems, of course, require testing and periodic adjustment and its is not always practical to adjust or test the system in actual use and an apparatus which will simulate a modulated echo signal and which is under the control of the operator is highly desirable.

The instant invention provides a mechanism which is specifically adapted for testing such signals and for accepting a generated transmission signal, modulating such signal and reimpressing the signal on the system so that suitable adjustments and tests may be conducted at will.

More specifically the instant invention contemplates a tunable microwave resonant cavity provided with a mechanism whereby the microwave energy existing therein may be suitably modulated so that the resonant cavity may be caused to constitute a source of suitably modulated energy and in effect replaces or acts as a substitute for the modulated energy that would be normally reflected from a reflecting body or bodies in actual use.

A purpose of the instant invention therefore, is to provide a mechanism for testing radio ranging and echo systems the functioning of which depends on the modulation components existing in the received echo signal.

A further purpose of the instant invention is to provide a mechanism for testing radio ranging and echo systems which depend for their operation on a difference in characteristic between a transmitted signal and a received return echo signal.

Another purpose of the instant invention is to provide a microwave resonant cavity provided with an arrangement whereby the exciting energy may be modified in any suitable manner.

A still further purpose of the instant invention is to provide a microwave resonant cavity of the re-entrant type including provisions for modulating the microwave energy extractable therefrom.

A further understanding of the invention may be secured from the following description when considered together with the attached drawings in which.

Figure 1:
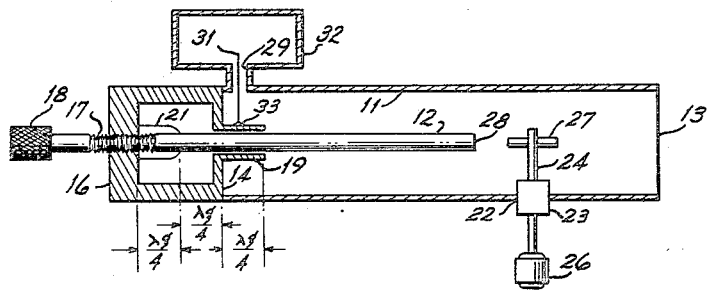
Figure 1 is an illustration in section of one form of the invention.

Referring now to Fig. 1 a tunable coaxial resonant cavity is there illustrated consisting of an outer tubular conductor 11 open at its end 13 and closed adjacent its other end by a metallic wall 14. The tubular conductor 11 is provided with an extension 16 extending rearwardly of the wall 14 in order to provide a support for an inner rod conductor 12 which projects through the wall 14 into the main portion of the cavity 11. In order that the depth of insertion of the rod 12 in the conductor 11 may be conveniently adjusted, the rod 12 is provided with a threaded portion 17 cooperating with internal threads formed on the end wall of the extension 16, the outer end of the rod 12 being provided with a knurled adjusting knob 18.

At the point where the rod 12 projects through the wall 14 into the main portion of the cavity a wave trap is provided consisting of a quarter-wave sleeve 19, and to the rear of wall 14 a plurality of contact fingers 21 make spring contact with the control rod or conductor 12.

In order that microwave energy may be introduced into and abstracted from the cavity, the cavity is coupled to a rectangular wave guide 32, here illustrated as extending at right angles to the axis of the cavity although other angles of intersection between these two elements may be used where desired depending on the required positioning of the elements in a system with which the resonant cavity is to be used. Coupling between the wave guide 32 and the resonant cavity is obtained through the use of a short coaxial line consisting of an outer tubular conductor 29 extending between suitable apertures formed in the wave guide and resonant cavity, and a central conductor 31 connected at 33 to the sleeve 19 and extending centrally of the conductor 29 into the wave guide 32.

The length of the central conductor 12 encompassed within the main portion of the resonant cavity 11 determines the resonant frequency of the device, such length being an odd multiple of a quarter wavelength and hence tuning is, in the first instance accomplished by adjustment of the length of insertion through the medium of the knob 18 and the threaded connection 17. This relationship of length of insertion to resonant frequency can, however, be affected by departure of the shape of the cavity from regularity and by capacitance effects existing between the free end of the internal conductor 12 and tubular surrounding cavity 11. If for example, the capacitance between the free end of the rod and the cavity is varied the resonant frequency of the cavity is varied approximately in inverse proportion to the square root of such change in capacitance.

In the present invention this change in capacitance in a cyclic fashion and hence modulation of the energy within the cavity is accomplished by varying the distance between the end 28 of the rod 12 and a contiguous metallic body. To this end the tubular conductor 11 is provided with an aperture 22 into which there is inserted a bushing 23 composed of any suitable microwave dielectric material. Journalled in the bushing 23 is a shaft 24 which is rotated by an externally mounted motor 26 and which is provided at its inner end with a cross member 27 projecting adjacent the end 28 of the conductor 12. Thus as the shaft 24 is rotated by the motor 26 the distance between the end of the conductor 12 and the ends of the cross member 27 are cyclically increased and decreased varying the capacitance between these members in the same fashion and likewise the capacitance between the rod 12 and conductor 11, the principal path therebetween being through the air dielectric existing between the end 28 of the rod 12 and the ends of the cross member 27 which cyclically varies as indicated, thence through the shaft 24 and dielectric material 23 to the tubular outer conductor 11.

Coaxial resonant cavities are ordinarily excited in the principal or TEM mode, and in the instant case such excitation is deemed preferable although not essential. It may, therefore, be desirable to limit the cross sectional dimensions of the resonant cavity in the manner well known in the art so that all resonation within the cavity is restricted to the principal mode.

In operation, the cavity is excited by pulses of microwave energy coupled to it through the coaxial coupling conductors 29 and 31 from the rectangular hollow guide 32. The cavity is tuned by adjusting the length of its central member 12 by rotating the knob 18 to screw the rod 12 in or out until its length within the cavity is nominally that of an odd multiple of one-quarter of the wavelength of the applied energy, when maximum resonance is developed. If now the motor 26 be started, the movements of the ends of the cross bar 27 toward and away from the end 28 of the central conductor 12 will produce two complete attenuations of capacitance during each revolution of the shaft 24, thereby producing at the same time two attenuations of the resonant frequency of the cavity, cyclically tuning and detuning it with respect to the input microwave frequency. As a result, the cavity after being excited by the successive applied pulses, the amount of detuning caused by rotation of the cross bar 27 modulates the energy within the cavity and the resonations thereof following each pulse will cyclically vary in strength.

Figure 2:
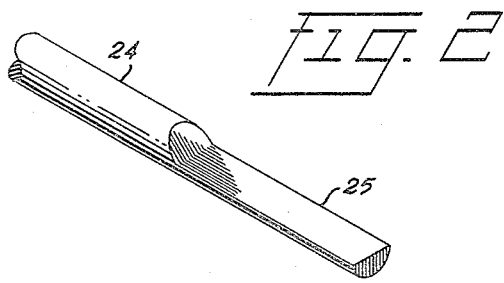
Figure 2 is an illustration of a modified form of mechanical modulator which may be used in connection with the form of the invention illustrated in Fig. 1.

If the hollow guide 32, in addition to connection to a microwave transmitter, is also connected to a microwave received through a transmit-receive (TR) tube, the receiver will be energized from the resonations of the resonant cavity after each pulse. However, the receiver will be energized by varying amounts because of the varying strengths of the resonations, and these variations will constitute amplitude modulation.

Where desired other forms of cross members and shafts 24 may be utilized to produce the desired modulating effects, it being necessary only that there be sufficient irregularity in shape so that the air space between the end 28 of the internal conductor 12 and the cross member on the shaft be capable of variation. For example the cross member may be eliminated and the shaft 24 merely provided with a flattened end portion 25 located adjacent the rod 12 (see Fig. 2). Likewise for more nearly sinusoidal variation of the energy within the cavity the shaft 24 may be made elliptical in cross section at the point adjacent the conductor 12.

Figure 3:
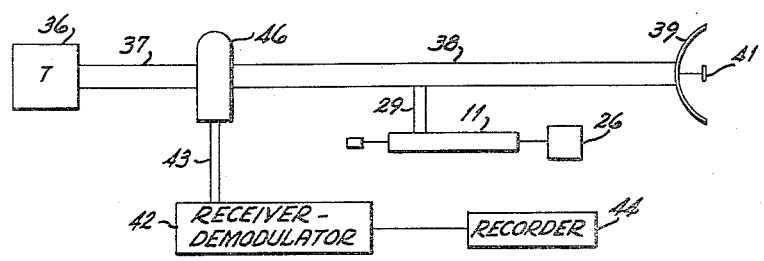
Figure 3 illustrates the manner in which the invention may be utilized in testing one form of radar system.

In Fig. 3 there is illustrated one manner in which the device may be utilized to test and adjust a radar system. The system here chosen by way of example, includes a pulse generator 36 connected through wave guide sections 37 and 38 to a radiating means illustrated as a parabolic reflector 39 and dipole 41. This same radiating system is utilized to receive the reflected or echo signal and to that end a receiver 42 including a demodulator for deriving a useful signal from the modulations occurring in the reflected wave is connected to the reflector 39 and dipole 41 through the wave guide sections 38 and 43 and the output of the receiver 42 is connected to operate any suitable recorder or other modulation signal utilizing apparatus 44.

As is usual in such cases the receiver is isolated from the pulse generator so that generated pulses are not directly impressed on the receiver as they pass to the radiating system and at the same time received echo signals of much lower power are transmitted directly to the receiver the circuit to the pulse generator 36 being opened at such times that a pulse signal is not being transmitted to prevent dissipation of received energy in such circuit. For this purpose any of the well known duplexing circuits may be used and such an arrangement is here diagrammatically illustrated by a TR tube 46.

The modulable resonant cavity 11 of the invention is connected to the wave guide section 38 through the coaxial coupling 29 at a point intermediate the radiating system and the point of connection of the receiver 42 to the wave guide section. Thus when signals are generated by the pulse generator 36 they are not only transmitted to the radiating system but are also transmitted to the resonant cavity 11 for shock excitation thereof. The energy resulting from such shock excitation is modulated by the motor 26 and as so modulated is impressed on the receiver 42 through the duplexing system so that a source of accurately controllable modulated energy which simulates an echo signal is at all times available for adjustment and tests of the receiver and utilization circuits.

What is claimed is:

1. A modulating microwave resonant cavity comprising, a hollow tubular conductor closed at one end, a conductive rod projecting through said closed end into said hollow tubular conductor coaxially therewith, means for adjusting the amount by which said rod projects into said tubular conductor, a shaft extending into said hollow tubular conductor in a direction normal to the axis thereof, said shaft being provided with a noncircular end portion positioned adjacent the distal end of said conductive rod, means for rotating said shaft, and means for impressing microwave energy internally of said tubular conductor and for deriving microwave energy therefrom.

2. A modulating microwave resonant cavity comprising, a hollow tubular conductor closed at one end, a conductive rod projecting through said closed end into said hollow tubular conductor coaxially therewith, means for adjusting the amount by which said rod projects into said hollow tubular conductor, a circularly discontinuous element positioned adjacent the distal end of said conductive rod with its circular discontinuity in axial alignment therewith and entirely enclosed within said hollow tubular conductor, means for rotating said circularly discontinuous element, and means for impressing microwave energy internally of said tubular conductor and for deriving microwave energy therefrom.

3. A modulating microwave resonant cavity comprising, a hollow tubular conductor closed at one end, a conductive rod projecting through said closed end into said hollow tubular conductor coaxially therewith, means for adjusting the amount by which said rod projects into said hollow tubular conductor, a shaft extending into said tubular conductor in a direction normal to the axis thereof, a cross member carried by said shaft and positioned adjacent the distal end of said conductive rod, means for rotating said shaft, and microwave energy coupling means associated with said hollow tubular conductor and conductive rod.

4. A modulating microwave resonant cavity comprising, a hollow tubular conductor closed at one end, a conductive rod projecting through said closed end into said hollow tubular conductor coaxially therewith, means for adjusting the amount by which said rod projects into said hollow tubular conductor, a shaft extending into said tubular conductor in a direction normal to the axis thereof and having a flattened end portion positioned adjacent the distal end of said conductive rod, means for rotating said shaft, and microwave coupling means associated with said hollow tubular conductor and conductive rod.

5. A modulating microwave resonant cavity comprising, a hollow tubular conductor closed at one end, a conductive rod projecting through said closed end into said hollow tubular conductor coaxially therewith, a shaft extending into said hollow tubular conductor in a direction normal to the axis thereof, said shaft being provided with a noncircular end portion positioned adjacent the distal end of said conductive rod, means for rotating said shaft, and means for impressing microwave energy internally of said tubular conductor and for deriving microwave energy therefrom.

References Cited in the file of this patent

UNITED STATES PATENTS

| | | | |
|---|---|---|---|
| 2,153,205 | Park | Apr. 4, | 1939 |
| 2,426,992 | Folland et al. | Sept. 9, | 1947 |
| 2,444,041 | Harrison | June 29, | 1948 |
| 2,451,825 | Guarrera | Oct. 19, | 1948 |
| 2,460,827 | Isely | Feb. 8, | 1949 |
| 2,492,996 | Haxby | Jan. 30, | 1950 |
| 2,599,905 | Fano | June 10, | 1952 |
| 2,680,229 | Lambert | June 1, | 1954 |